(12) United States Patent
Kotsakis et al.

(10) Patent No.: US 12,460,346 B2
(45) Date of Patent: Nov. 4, 2025

(54) LACTAM COATED TEXTILE (71) Applicant: Conopco, Inc., Englewood Cliffs, NJ (US)

(72) Inventors: Panagiotis Kotsakis, Athens (GR); Neil James Parry, Tarporley (GB)

(73) Assignee: Conopco, Inc., Englewood Cliffs, NJ (US)

( * ) Notice: Subject to any disclaimer, the term of this patent is extended or adjusted under 35 U.S.C. 154(b) by 794 days.

(21) Appl. No.: 17/272,376

(22) PCT Filed: Sep. 6, 2019

(86) PCT No.: PCT/EP2019/073895
§ 371 (c)(1),
(2) Date: Mar. 1, 2021

(87) PCT Pub. No.: WO2020/053105
PCT Pub. Date: Mar. 19, 2020

(65) Prior Publication Data
US 2021/0332526 A1   Oct. 28, 2021

(30) Foreign Application Priority Data
Sep. 14, 2018  (EP) ..................................... 18194524

(51) Int. Cl.
*D06M 13/418*   (2006.01)
*C07D 207/44*   (2006.01)
(Continued)

(52) U.S. Cl.
CPC ......... *D06M 13/418* (2013.01); *C07D 207/44* (2013.01); *D06M 23/12* (2013.01);
(Continued)

(58) Field of Classification Search
CPC ............... D06M 13/418; D06M 23/12; D06M 2101/06; D06M 2101/20; D06M 2101/22; C07D 207/44
See application file for complete search history.

(56) References Cited

U.S. PATENT DOCUMENTS 6,413,529 B1   7/2002   Beerse et al.
6,482,423 B1   11/2002  Beerse et al.
(Continued)

FOREIGN PATENT DOCUMENTS

CN   1229335 A   9/1999
CN   1346263 A   4/2002
(Continued)

OTHER PUBLICATIONS

Search Report and Written Opinion in EP 18194524; Mar. 28, 2019.
(Continued)

*Primary Examiner* — Amina S Khan
(74) *Attorney, Agent, or Firm* — Carter, DeLuca & Farrell LLP; George Likourezos; Bret P. Shapiro

(57) ABSTRACT

The invention relates to a modified textile comprising a) a textile substrate; and, b) a lactam coating; and to the use of a lactam to impart anti-biofilm properties to a textile; and to the use of a lactam to inhibit biofilm growth on a textile substrate; wherein the lactam is selected from: (I) 4-(4-chlorophenyl)-5-methylene-pyrrol-2-one; and (II) 5-methyl-ene-4-(p-tolyl)pyrrol-2-one; (III) 4-(4-bromophenyl)-5-methylene-pyrrol-2-one; (IV) 4-(3-chlorophenyl)-5-methylene-pyrrol-2-one; (V) 4-(2-fluorophenyl)-5-methylene-pyrrol-2-one; and (VI).

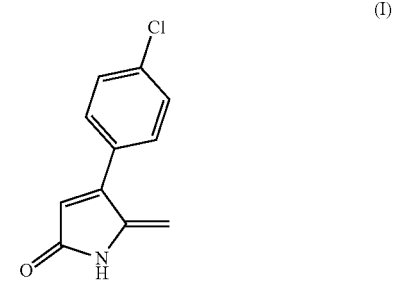

(I)

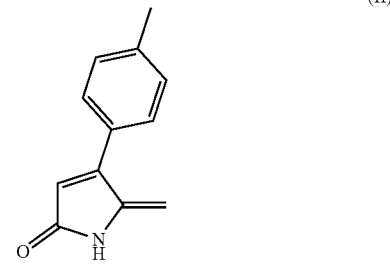

(II)

(III)

(IV)

(V)

(Continued)

-continued

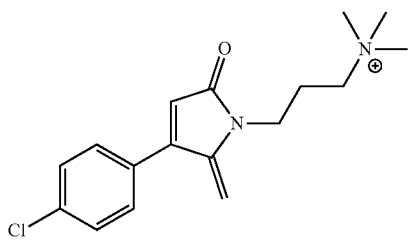
(VI)

6 Claims, 7 Drawing Sheets (51) Int. Cl.
*D06M 23/12* (2006.01)
*D06M 101/06* (2006.01)
*D06M 101/20* (2006.01)
*D06M 101/22* (2006.01)

(52) U.S. Cl.
CPC .... *D06M 2101/06* (2013.01); *D06M 2101/20* (2013.01); *D06M 2101/22* (2013.01)

(56) References Cited

U.S. PATENT DOCUMENTS

| | | | |
|---|---|---|---|
| 9,586,901 B2 | 3/2017 | Kumar et al. | |
| 2002/0031478 A1 | 3/2002 | Keller et al. | |
| 2011/0045037 A1 | 2/2011 | Tamarkin et al. | |
| 2014/0323386 A1 | 10/2014 | Matsuzawa et al. | |
| 2015/0351393 A1 | 12/2015 | Parry et al. | |
| 2015/0373970 A1 | 12/2015 | Truong et al. | |
| 2017/0096391 A1 | 4/2017 | Kumar et al. | |
| 2017/0157175 A1 | 6/2017 | Tamarkin et al. | |
| 2018/0084777 A1 | 3/2018 | Jiang | |
| 2018/0153804 A1 | 6/2018 | Tamarkin et al. | |
| 2018/0228153 A1 | 8/2018 | Price | |
| 2018/0244616 A1 | 8/2018 | O'Keeffe et al. | |

FOREIGN PATENT DOCUMENTS

| | | | |
|---|---|---|---|
| CN | 1346264 A | 4/2002 | |
| CN | 101410372 A | 4/2009 | |
| CN | 103842491 A | 6/2014 | |
| CN | 104981157 A | 10/2015 | |
| CN | 105050393 A | 11/2015 | |
| CN | 108024939 A | 5/2018 | |
| EP | 2778217 A1 | 9/2014 | |
| GB | 823062 | 11/1959 | |
| WO | 9802044 A1 | 1/1998 | |
| WO | 0061107 A1 | 10/2000 | |
| WO | WO 01/88081 * | 11/2001 | ............. C11D 17/04 |
| WO | WO0240628 | 5/2002 | |
| WO | WO02092902 | 11/2002 | |
| WO | WO2007085042 | 8/2007 | |
| WO | WO-2007085042 A1 * | 8/2007 | ........... C07D 207/38 |
| WO | WO2009103735 | 8/2009 | |
| WO | WO2010125470 | 11/2010 | |
| WO | WO 2014/118240 * | 8/2014 | ............. A01N 25/02 |
| WO | WO 2017/029070 * | 2/2017 | ............... A61K 8/49 |
| WO | WO-2017029104 A1 * | 2/2017 | ........... C07D 201/08 |
| WO | WO2017108565 | 6/2017 | |
| WO | WO2018091222 | 5/2018 | |

OTHER PUBLICATIONS

Search report and Written Opinion in EP18194562; Feb. 27, 2019.
Search Report and Written Opinion in 18194538; Feb. 28, 2019.
Search Report and Written Opinion in PCTEP2019073906, Oct. 16, 2019.
Search Report and Written Opinion in PCTEP2019073895; Nov. 15, 2019.
Search Report and Written Opinion in PCTEP201907390; Dec. 5, 2019.
Co-pending application, U.S. Appl. No. 17/272,378.
Co-pending application, U.S. Appl. No. 17/272,382.

* cited by examiner

Figure 1 – *SEM Polypropylene non-woven coated with lactam in acrylic emulsion*

Sample 1500x

Control 1500x

Figure 2 - *SEM Viscose non-woven padded with lactam in polyurea encaps*

Sample 1500x

Control 1500x

Figure 3 – *SEM Polypropylene non-woven printed with lactam in solvents*

Sample 1500x

Control 1500x

Figure 4 - *SEM Fluorinated polypropylene non-woven coated with cationic lactam*

Sample 1500x

Control 1500x

Figure 5 - *Pseudomonas Aeruginosa*-GFP biofilm growth curve inhibition on lactam-based textiles by fluorescence - Lactam in acrylic emulsion binder on textile

Figure 6 - *Pseudomonas Aeruginosa*-GFP biofilm growth curve inhibition on lactam-based textiles by fluorescence - Lactam printed on textile Figure 7 - *Pseudomonas Aeruginosa*-GFP biofilm growth curve inhibition on lactam-based textiles by fluorescence - Encapsulated lactam padded on textile Figure 8 - *Pseudomonas Aeruginosa* on polyethylene and cotton Figure 9 – *Candida albicans* on polyethylene and cotton Figure 10 – *Staphylococcus aureus* on polyethylene and cotton

LACTAM COATED TEXTILE

FIELD OF INVENTION

The invention relates to a modified textile.

BACKGROUND OF THE INVENTION

Textiles are widely used for many different purposes. For example, in clothing products, including sportswear, healthcare, and hygiene applications, including surface care products such as surface cleaning textiles.

However, textiles are prone to microorganism growth, due to their contact in use with microorganisms and because they generally have a large, moist, surface area environment. These conditions are conducive to microorganism growth on the textile.

Microorganism growth on textiles, especially textiles designed to be durable for multiple use is a problem, and leads to numerous unwanted effects, such as unpleasant odour on clothes, or potential cross contamination when a multiple use textile is used for health and hygiene purposes.

WO 02/092902 A1 discloses using α-amino-ε-caprolactam to treat fibres to impart antibacterial properties to fibres.

There is thus a need for effective textiles that are microorganism resistant, meaning they can be reused multiple times with reduced microorganism build-up on the textile, or even without microorganism build-up on the textile.

SUMMARY OF THE INVENTION

We have found that by modifying the textile by applying a lactam coating, the resulting modified textile displayed biofilm inhibition on the textile itself. This allows for a textile that is microorganism resistant, that is durable and can be reused multiple times.

The invention relates in a first aspect to a modified textile comprising:
 a) a textile substrate; and,
 b) a lactam coating,
 wherein the lactam is a lactam selected from:

4-(4-chlorophenyl)-5-methylene-pyrrol-2-one; and

5-methylene-4-(p-tolyl)pyrrol-2-one;

4-(4-bromophenyl)-5-methylene-pyrrol-2-one;

4-(3-chlorophenyl)-5-methylene-pyrrol-2-one;

4-(2-fluorophenyl)-5-methylene-pyrrol-2-one; and

Preferably the lactam is present at a level of from 0.0001 to 2.5 wt. %, preferably from 0.0001 to 1 wt. %.

More preferably the lactam is a lactam selected from:

4-(4-chlorophenyl)-5-methylene-pyrrol-2-one; and 5-methylene-4-(p-tolyl)pyrrol-2-one.

Most preferably the lactam is:

4-(4-chlorophenyl)-5-methylene-pyrrol-2-one.

Where the lactam is cationic in nature, the cation can be used or with a suitable counterion (e.g. iodide).

Preferably the lactam is in encapsulated form.

Preferably the textile is selected from woven, knitted and non-woven textiles, preferably non-woven. Preferred textiles are selected from cotton, polyester, nylon elastane, viscose, polyethylene, polypropylene, rayon, wood pulp and mixtures of these prepared as composite.

It is preferred that the modified textile includes a binder, preferably wherein the binder is an acrylic binder.

In a second aspect, the invention relates to the use of a lactam to impart anti-biofilm properties to a textile.

In a third aspect, the invention relates to the use of a lactam to inhibit biofilm growth on a textile substrate.

In these uses, the lactam has the following structure:

4-(4-chlorophenyl)-5-methylene-pyrrol-2-one; and

5-methylene-4-(p-tolyl)pyrrol-2-one;

4-(4-bromophenyl)-5-methylene-pyrrol-2-one;

4-(3-chlorophenyl)-5-methylene-pyrrol-2-one;

4-(2-fluorophenyl)-5-methylene-pyrrol-2-one; and

Where the lactam is cationic in nature, the cation can be used or with a suitable counterion (e.g. iodide).

DETAILED DESCRIPTION OF THE INVENTION

The indefinite article "a" or "an" and its corresponding definite article "the" as used herein means at least one, or one or more, unless specified otherwise.

It will be appreciated that, except where expressly provided otherwise, all preferences are combinable.

Lactam

A lactam is a cyclic amide. Preferred lactams are γ-lactams which have 5 ring atoms.

The lactam is a lactam selected from:

4-(4-chlorophenyl)-5-methylene-pyrrol-2-one; and 5-methylene-4-(p-tolyl)pyrrol-2-one;

4-(4-bromophenyl)-5-methylene-pyrrol-2-one;

4-(3-chlorophenyl)-5-methylene-pyrrol-2-one;

4-(2-fluorophenyl)-5-methylene-pyrrol-2-one; and

Where the lactam is cationic in nature, the cation can be used or with a suitable counterion (e.g. iodide).

Preferably the lactam is selected from:

4-(4-chlorophenyl)-5-methylene-pyrrol-2-one; and 5-methylene-4-(p-tolyl)pyrrol-2-one.

Most preferably the lactam is 4-(4-chlorophenyl)-5-methylene-pyrrol-2-one.

Preferably the lactam is encapsulated.

Suitably, the encapsulated lactam is a polymer encapsulated lactam.

The encapsulated lactam may be encapsulated in a polymer selected from a poly urea polymer, a melamine-formaldehyde copolymer; a urea formaldehyde copolymer and mixtures thereof.

Suitably the polymer is a condensation polymer. For example, the polymer may be a condensation polymer of produced from a diamine and a disocyanate.

For example, the polymer may be or may comprise a polyurea of Formula P1:

wherein $R^{P1}$ comprises a phenylene and $R^{P2}$ is an alkylene.

For example, $R^{P1}$ may be —CH$_2$-phenylene; in other words, the polymer may be derived from polymethylene polyphenyl isocyanate.

For example, $R^{P2}$ may be a straight chain alkylene of formula —(CH$_2$)$_m$—. In some cases, m is an integer from 2 to 10, for example from 2 to 8, for example from 4 to 8, for example, 6 (in other words, $R^{P2}$ may be hexylene).

In other words, the lactam may be encapsulated in a polymer formed from polymethylene polyphenyl isocyanate and hexamethylenediamine.

In some cases, the polymer and/or encapsulate structure is selected and/or configured to permit controlled or triggered release. For example, the encapsulate may dissolve at a pre-determined rate under certain conditions. For example, the encapsulate may release in response to a trigger. The trigger may be, for example, the presence or a certain concentration of acid, base, a salt, an enzyme; or a non-chemical trigger such as ultrasound or light.

Suitably, the lactam is encapsulated to form particles whose average diameter is from about 10 nanometers to about 1000 microns, preferably from about 50 nanometers to about 100 microns, more preferably from about 2 to about 40 microns, even more preferably from about 4 to 15 microns. A particularly preferred range is from about 5 to 10 microns, for example 6 to 7 microns. The capsule distribution can be narrow, broad or multimodal.

Multimodal distributions may be composed of different types of capsule chemistries.

The encapsulation process suitably is done in a carrier oil, which may be a ketone. For example, the carrier oil may be a $C_{5-20}$alkyl ketone, for example a $C_{5-15}$alkyl ketone, for example a $C_{5-10}$alkyl ketone, for example a $C_{6-8}$alkyl ketone, such as a $C_7$alkyl ketone. The alkylketone may be branched or straight-chain. Preferably, it is straight chain. The oxo group of the alkyl ketone may be located at C2; in other words, the alkylketone may be an alkyl-2-one. A preferred carrier oil is 2-heptanone.

Levels of Lactam

Preferably the lactam is present at a level of from 0.0001 to 2.5 wt. %, preferably from 0.0001 to 1 wt. %. For example, the lactam may be suitably present at levels of 0.001 to 1 wt. %, or even 0.01 to 1 wt. %, or even 0.01 to 0.5 wt. %.

Textile

A textile is a flexible material consisting of a network of natural or artificial fibres.

Preferred textiles are woven, knitted and non-wovens.

Non-woven textile is a material made from short (staple) and long fibers, bonded together by chemical, mechanical, heat or solvent treatment.

Woven textile is a material consisting of threads or yarns placed perpendicular to one another, then attached together through a pattern of "warp" and "weft."

Knitted textile is a material consisting of a single rolled up thread curling on itself to create interlaced loops.

Preferred non-woven textiles include viscose, polyethylene, polypropylene, rayon, wood pulp and mixtures of these prepared as composite, meltblown, carded, needle punch, thermal bonded, or chemically bonded.

Preferred wovens include cotton, polyester and mixtures of these.

Preferred knitted textiles include cotton, polyester, nylon elastane and mixtures of these.

Preferably the textile is selected from cotton, polyester, nylon elastane, viscose, polyethylene, polypropylene, rayon, wood pulp and mixtures of these prepared as composite.

One such use for the modified textiles of the invention involves their use as surface care products. They can be commonly used to clean a surface using for example a detergent, or to wipe a surface using for example an antimicrobial ingredient.

The current market for surface care products are generally disposable products, intended for single use. The mode of action is that any antimicrobial ingredient included in the surface care product is transferred to the surface, where the antimicrobial ingredient acts on the surface to kill microorganisms or stop their growth. The contact with the microorganisms results in transfer to the surface care product and results in fouling (defined as microorganism growth) of the surface care product. This is one of the reasons why the products are generally single use disposable products. The textiles of the invention are effective textiles for surface care that are durable and can be reused multiple times without fouling of the textile.

Binder

Preferably the modified textile comprises a binder. The inclusion of type of binder can be chosen accordingly depending on the method used to incorporate the lactam in the modified textile.

Suitably when the lactam is incorporated in the modified textile by way of an acrylic emulsion (anionic emulsion based on acrylic co-polymer), then suitable binders include commercially available Itobinder AG, Itobinder U30, and Itobinder CEL.

An encapsulated lactam, preferably polyurea encapsulated lactam, can preferably be mixed with the binder to allow easy incorporation onto the textile.

Another way of incorporating the lactam is to print it directly onto the textile. In this case it is 10 suitable to include the lactam as a mixture with printable UV curable inks, preferably containing acrylic acid esters, hexanediol diacrylates, and pthalocyanine pigments.

Optional Ingredients

Existing textile finishes including but not limited to anti-microbial coating (trichlosan, silver, quaternary ammonium salts) water proofing, anti-soiling, chemical and natural dyeing, anti-pilling, easy-care (e.g. non-iron), and fastening functionalities can be included as optional ingredients.

Methods of Manufacture of Incorporation of the Lactam on the Textiles

The following methods of coating with lactam were designed to provide a textile substrate with a lactam coating of 0.01 wt. %.

Acrylic Emulsions

Non-polar lactams were applied to a range of fibrous substrates typically used in nonwoven healthcare materials.

For the surface polymer binder applications, the following nonwoven substrates were used:
20 gsm Polypropylene (PP, spunbond);
70 gsm Viscose;
80 gsm Polyethylene (PE);
90 gsm Polypropylene (PP).

The lactam, in this case 4-(4-chlorophenyl)-5-methylene-pyrrol-2-one, was dissolved in a solvent (ethanol or DMSO) and mixed with a binder to a final concentration ranging from 10-100 mg/l solution. The mixture was then padded onto the fabrics to an 80-100% w/w binder/fabric pick-up, dried and subsequently heat cured at elevated temperature. The specific binder used can be tailored to the specific fibre of the textile, example binders being ITOBINDER AG, ITOBINDER U30 and ITOBINDER CEL.

Digital Printing

The polyethylene nonwoven was digitally printed with an 8.33% lactam 4-(4-chlorophenyl)-5-methylene-pyrrol-2-one glycol solution using a Dimatix Materials printer either as a solid 10×10 cm square or as a series of small solid printed blocks, respectively.

Encapsulation

Another approach to locating the lactam onto the fibre surface was through the incorporation of microcapsules loaded with lactam 4-(4-chlorophenyl)-5-methylene-pyrrol-2-one into the polymer binder. The surface polymer with the microcapsules was then flat abraded on a Martindale Abrasion instrument.

Direct, Electrostatic Incorporation

A positively charged version of lactam [(3-(3-(4-chlorophenyl)-2-methylene-5-oxo-2,5-dihydro-1H-pyrrol-1-yl)-N,N,N-trimethylpropan-1-aminium iodide] can be incorporated via direct padding in water on textiles that carry a negative charge due to gaseous fluorination.

Polyethylene and polypropylene nonwovens were gaseous fluorinated with a view to increasing surface wettability and anionic charge and providing strong electrostatic binding sites for the cationic lactam. The cationic lactam was also incorporated into fluorinated polyethylene and polypropylene nonwovens using a 100 mg/l lactam solution in solvent (ethanol or DMSO) and padding the material in a water solution onto the fabrics at 80-100% w/w binder/fabric pick up.

All lactam treated materials were rinsed in water for an extended period, air dried and assessed.

The invention will be further described with the following non-limiting examples.

EXAMPLES

Preparation of Examples of Preferred Lactams

Preparation of 4-(4-chlorophenyl)-5-hydroxy-5-methylfuran-2(5H)-One 1-(4-Chlorophenyl)propan-2-one (40.00 g, 34.75 mL, 237.2 mmol), glyoxylic acid monohydrate (32.75 g, 355.8 mmol) and phosphoric acid (69.74 g, 711.7 mmol) were combined at room temperature before heating to 85° C. overnight. After cooling to room temperature, the mixture was poured into a mixture of water (500 mL) and ethyl acetate (500 mL). The layers were separated and the aqueous phase extracted with ethyl acetate (500 mL). The combined organic layers were washed with a 1:1 mixture of water and brine (2×500 mL), dried (MgSO$_4$) and concentrated under reduced pressure to yield 4-(4-chlorophenyl)-5-hydroxy-5-methylfuran-2(5H)-one (66.00 g, >100% yield) as a brown oil. The material was used in the next step without further purification.

Preparation of 4-(4-chlorophenyl)-5-hydroxy-5-methyl-1H-pyrrol-2(5H)-One

4-(4-Chlorophenyl)-5-hydroxy-5-methylfuran-2(5H)-one (66.00 g, 293.8 mmol) was dissolved in thionyl chloride (196.8 g, 120.0 mL, 1654 mmol) and heated at 40° C. for 1 hour, then 80° C. for 2 hours. The mixture was concentrated under reduced pressure and azeotroped with 2-methyltetrahydrofuran (200 mL). The residue was diluted with 2-methyltetrahydrofuran (160 mL) and this solution added to a cooled stirring mixture of 28% ammonia in water (180 mL) in 2-methyltetrahydrofuran (20 mL) at 0° C. The mixture was warmed to room temperature and stirred overnight. Water (100 mL) and ethyl acetate (200 mL) were added and the layers separated. The aqueous phase was extracted with ethyl acetate (200 mL), and the combined organic extracts dried (MgSO$_4$) and concentrated under reduced pressure. Purification by dry flash column chromatography (5-60% ethyl acetate in heptane) yielded 4-(4-chlorophenyl)-5-hydroxy-5-methyl-1H-pyrrol-2(5H)-one (23.18 g, 35% yield) as a cream coloured solid.

$^1$H NMR (400 MHz, d$_6$-DMSO) 8.55 (brs, 1H), 7.88-7.83 (m, 2H), 7.51-7.46 (m, 2H), 6.37 (d, 1H), 6.32 (s, 1H), 1.45 (s, 3H)

UPLC (Basic) 1.51/5.00 min, 100% purity, M+H$^+$ 224

MP 177° C.

Preparation of 4-(4-chlorophenyl)-5-methylene-1H-pyrrol-2(5H)-One

To a cooled solution of 4-(4-chlorophenyl)-5-hydroxy-5-methyl-1H-pyrrol-2(5H)-one (10.00 g, 44.51 mmol) in dry dichloromethane (100 mL) at 0° C. was added a solution of boron trifluoride diethyl etherate (8.213 g, 7.142 mL, 57.87 mmol) in dry dichloromethane (45 mL) over 15 minutes. The mixture was stirred at 0° C., before slowly warming to room temperature and stirring for 2 hours. The reaction was quenched with ice-water (100 mL) and the layers separated. The aqueous layer was extracted with dichloromethane (100 mL), and the combined organic layers washed with a 1:1 mixture of water and saturated aqueous sodium hydrogen carbonate solution (100 mL), dried (MgSO$_4$) and filtered. Silica was added to the filtrate and the mixture stirred for 10 minutes before filtering through a plug of silica, washing through with dichloromethane followed by a 3:1 mixture of dichloromethane:diethyl ether. Fractions containing the desired product were combined and concentrated under reduced pressure. Upon concentration a precipitate formed, which was collected by filtration, washing with diethyl ether, to yield 4-(4-chlorophenyl)-5-methylene-1H-pyrrol-2(5H)-one (5.25 g, 57% yield) as a cream coloured solid.

$^1$H NMR (400 MHz, d$_6$-DMSO) 10.10 (s, 1H), 7.54-7.47 (m, 4H), 6.36 (s, 1H), 5.04 (t, 1H), 4.85 (s, 1H)

UPLC (Basic) 1.87/5.00 min, 100% purity, M+H$^+$ 206

MP 182° C.

Preparation of 5-hydroxy-5-methyl-4-(p-tolyl)furan-2(5H)-One 1-(p-Tolyl)propan-2-one (25.00 g, 24.00 mL, 168.7 mmol), glyoxylic acid monohydrate (23.29 g, 253.0 mmol) and phosphoric acid (49.60 g, 506.1 mmol) were combined at room temperature before heating at 90° C. overnight. After cooling to room temperature, the mixture was poured into a stirring mixture of ice-water (400 mL) and ethyl acetate (400 mL). The layers were separated and the organic phase washed with water (100 mL), dried (MgSO$_4$) and concentrated under reduced pressure. The mixture was azeotroped with 2-methyltetrahydrofuran (50 mL) to yield 5-hydroxy-5-methyl-4-(p-tolyl)furan-2(5H)-one (16.50 g, 48% yield) as a brown solid.

$^1$H NMR (400 MHz, d$_6$-DMSO) 7.86 (s, 1H), 7.75 (d, 2H), 7.28 (d, 2H), 6.59 (s, 1H), 2.32 (s, 3H), 1.61 (s, 3H)

Preparation of 5-hydroxy-5-methyl-4-(p-tolyl)-1H-pyrrol-2(5H)-One

5-Hydroxy-5-methyl-4-(p-tolyl)furan-2(5H)-one (16.50 g, 80.80 mmol) was dissolved in thionyl chloride (48.06 g, 29.47 mL, 404.0 mmol) and heated at 50° C. for 1 hour, before heating at reflux for 1 hour. After cooling to room temperature, the mixture was concentrated under reduced pressure and azeotroped with 2-methyltetra-hydrofuran (2×50 mL). The residue was diluted with 2-methyltetrahydrofuran (60 mL) and this solution added to a cooled stirring mixture of 28% ammonia in water (55 mL, 808.0 mol) in 2-methyltetrahydrofuran (10 mL) at 0° C. The mixture was warmed to room temperature and stirred overnight. 2-Methyltetrahydrofuran was removed under reduced pressure, and the residue diluted with water (200 mL) and diethyl ether (100 mL) and the mixture stirred for 20 minutes at room temperature. The solids were collected by filtration and stirred in water (100 mL) and diethyl ether (50 mL) at room temperature for 10 minutes. The solids were collected by filtration and washed with water, diethyl ether and dried under vacuum at 50° C. to yield 5-hydroxy-5-methyl-4-(p-tolyl)-1H-pyrrol-2(5H)-one (10.49 g, 31% yield) as a light beige solid.

$^1$H NMR (400 MHz, d$_6$-DMSO) 8.44 (brs, 1H), 7.73 (d, 2H), 7.21 (d, 2H), 6.24 (s, 2H), 2.29 (s, 3H), 1.45 (s, 3H)

$^{13}$C NMR (400 MHz, d$_6$-DMSO) 170.4 (s, 1C), 161.1 (s, 1C), 139.8 (s, 1C), 129.7 (s, 2C), 128.9 (s, 1C), 128.2 (s, 2C), 119.1 (s, 1C), 87.8 (s, 1C), 26.7 (s, 1C), 21.5 (s, 1C)

UPLC (Basic) 1.41/5.00 min, 100% purity, M+H$^+$ 204

MP 178° C. Decomposition

Preparation of 5-methylene-4-(p-tolyl)-1H-pyrrol-2(5H)-One

To a cooled solution of 5-hydroxy-5-methyl-4-(p-tolyl)-1H-pyrrol-2(5H)-one (8.68 g, 42.7 mmol) in dry dichloromethane (87 mL) at 0° C. was added a solution of boron trifluoride diethyl etherate (6.85 g, 5.96 mL, 55.5 mmol) in dry dichloromethane (40 mL) over 15 minutes. After 1 hour the mixture was allowed to slowly warm to room temperature. After a further 3 hours, the reaction was diluted with dichloromethane (50 mL) and ice-water (100 mL) and stirred for 10 minutes. The layers were separated and the organic layer washed with water (100 mL), a 1:1 mixture of water and saturated aqueous sodium hydrogen carbonate solution (100 mL) and brine (100 mL) and the organic layer filtered through Celite, washing with dichloromethane. Any excess water was removed by pipette before drying the filtrate (MgSO$_4$) and concentrating under reduced pressure to a brown solid. The solids were stirred in hot dichloromethane (120 mL) for 15 minutes before slowly cooling to room temperature and then 0° C. The solids were collected by filtration to yield 5-methylene-4-(p-tolyl)-1H-pyrrol-2 (5H)-one (3.87 g, 49% yield) as a yellow solid. Silica was added to the filtrate and the mixture stirred for 10 minutes before filtering through a plug of silica, washing through with dichloromethane and then a 4:1 mixture of dichloromethane:diethyl ether. The filtrate was concentrated under reduced pressure to yield 5-methylene-4-(p-tolyl)-1H-pyrrol-2(5H)-one (0.58 g, 7%) as a yellow solid. Total yield of 5-methylene-4-(p-tolyl)-1H-pyrrol-2(5H)-one (4.45 g, 56% yield).

$^1$H NMR (400 MHz, d$_6$-DMSO) 10.11 (brs, 1H), 7.35 (d, 2H), 7.25 (d, 2H), 6.25 (s, 1H), 5.01 (s, 1H), 4.85 (s, 1H), 2.31 (s, 3H)

UPLC (Basic) 1.83/5.00 min, 100% purity, M+H$^+$ 186

MP 200° C. Decomposition

Examples of Coating the Textile with the Lactam

Synthesis of Polyurea Capsules Containing Lactam ABT0479

Particle slurries were created from an oil in water emulsion, followed by interfacial polymerisation between a diamine and polyisocyanate to form the shells of the capsules and ultimately yield dispersions of polyurea particles in an aqueous continuous phase. The oil-phase payload consisted of an organic solvent chosen as a proxy for fragrance, in which the lactam was dissolved. Two variants were prepared, one containing I and a second without lactam as a control.

The lactam used was in these experiments 4-(4-chlorophenyl)-5-methylene-pyrrol-2-one and is given the code 488. The structure is:—

Solution A consisted of a 0.5 wt. % solution of 4-(4-chlorophenyl)-5-methylene-1H-pyrrol-2(5H)-one, referred to as lactam ABT0479 and was prepared by dissolving lactam (25 mg, 0.122 mmol) in 2-heptanone (5.00 g, 43.787 mmol). To this was added polyphenylmethylene diisocyanate or PMDI (0.42 g, 1.235 mmol, average molecular weight 340 g mol-).

Solution B consisted of a 3 wt. % solution of Morwet D425 and was prepared by dissolving the Morwet (480 mg) in water (15.52 g).

Solution C consisted of a 40 wt. % solution of hexamethylene diamine and was prepared by dissolving the diamine (400 mg, 3.442 mmol) in water (0.60 g).

Solution A and Solution B were combined in a large glass vial and subjected to high shear mixing using a miniature probe, 15,000 rpm for 3 minutes. Once homogenisation was complete, the dispersion was transferred to a magnetic stirring platform and Solution C added drop-wise over 1 minute whilst stirring at 250 rpm, ensuring a vortex was maintained for complete mixing. The vial was sealed, and the dispersion stirred for a further 2 hours, before being left on a flatbed roller overnight at ambient temperature.

Particle size and morphology were determined by light scattering measurements and optical microscopy (control, 4.08 μm; lactam, 5.06 μm). Some minor aggregation of the primary particles was noted for the variant containing lactam.

Example 1—*Pseudomonas* PAO1 Biofilm Inhibition on Lactam-Based Textiles by SEM

*P. aeruginosa* (PA01) was cultured overnight at 37° C. on TSA plates. Prior to use in tests, colonies were added to 20 mL of brain-heart infusion broth (BHI) containing 5 mL of glass beads and homogenised for 30 seconds. The optical density of the organism was measured and adjusted to give $1\times10^8$ cfu/mL. Inoculum (0.3 ml) was placed directly on modified and unmodified textiles in 24-well plates and incubated overnight in appropriate broth. Textiles were subsequently removed, washed in PBS and fixed for microscopy.

SEM Sample Preparation

Fixative was prepared as described (Erlandsen, Kristich, Dunny, Wells, J. Histochem Cytochem, 2004), using 2% para-formaldehyde, 2% gluteraldehyde and 0.15M Sodium Cacodylate and 0.15% Alcian Blue, pH 7.4. The fixative was applied (enough to cover the biofilms) to the wells containing the biofilms on suitable substrates for 2 hours, this varied between 2 and 22 hours.

| Component | 5 ml | 10 ml | 15 ml | 20 ml |
|---|---|---|---|---|
| 8% Para-formaldehyde | 1.25 ml | 2.5 ml | 3.75 ml | 5 ml |
| 0.3M Sodium Cacodylate | 2.5 ml | 5 ml | 7.5 ml | 10 ml |
| 25% Gluteraldehyde | 0.4 ml | 0.8 ml | 1.2 ml | 1.6 ml |
| Distilled water | 0.85 ml | 1.7 ml | 2.55 ml | 3.4 ml |
| Alcian Blue | 0.0075 g | 0.015 g | 0.0225 g | 0.03 g |

Paraformaldehyde was prepared at 60° C. with 80 ml distilled water and 8 g of paraformaldehyde using a hot plate and magnetic stirrer. NaOH was added drop by drop until solution cleared and was adjusted to pH 7.2 with HCl.

Following fixation, the fixative solution was removed and 0.15M Sodium Cacodylate buffer was added to the samples. The samples were then stored in the fridge until processing. Samples were washed 3×5 mins with 300 ml fresh buffer to remove any remaining glutaraldehyde. Subsequently, a solution of 1% Osmium tetroxide (OsO4) was prepared 1:1 with 0.15M Sodium Cacodylate buffer, and added to the samples before incubating for 1 hour at room temperature. Samples were rinsed with distilled water 3×10 mins. 0.5% aqueous Uranyl acetate was then added to the samples before incubation in the dark for 30 mins at room temperature.

Samples were then dehydrated in an ascending ethanol series:

| Alcohol | Time |
|---|---|
| 30% alcohol | 2 × 5 mins |
| 50% alcohol | 2 × 5 mins |
| 70% alcohol | 2 × 5 mins |
| 90% alcohol | 2 × 5 mins |
| Absolute alcohol | 4 × 5 mins |
| Dried absolute alcohol | 2 × 5 mins |

Samples were transferred from the original 24-well plate into a petri dish of hexamethyldisilazane (HMDS) for 5 mins, then to a second dish for 5 mins before being placed in a new 24-well plate lined with filter paper. The plate was then placed in a desiccator overnight to allow evaporation and drying or samples.

After sputter coating with gold-palladium in an argon filled chamber, samples were viewed under a JEOL JSM-6400 scanning electron microscope and images were assembled using the Photoshop software.

The SEM images were measured and the amount of pixels of textile and pixels of bacteria were determined. The % of bacteria coverage is the bacteria pixels/total pixels.

Polypropylene Non-Woven Coated with Lactam in Acrylic Emulsion

| Textile | Fibre (pixels) | Bacteria (pixels) | % bacteria coverage |
|---|---|---|---|
| Polypropylene non-woven | 22,994 | 10,851 | 32.1% |
| Polypropylene non-woven + lactam (488) (from emulsion) | 23,726 | 2,660 | 10.1% |

Figure 1:
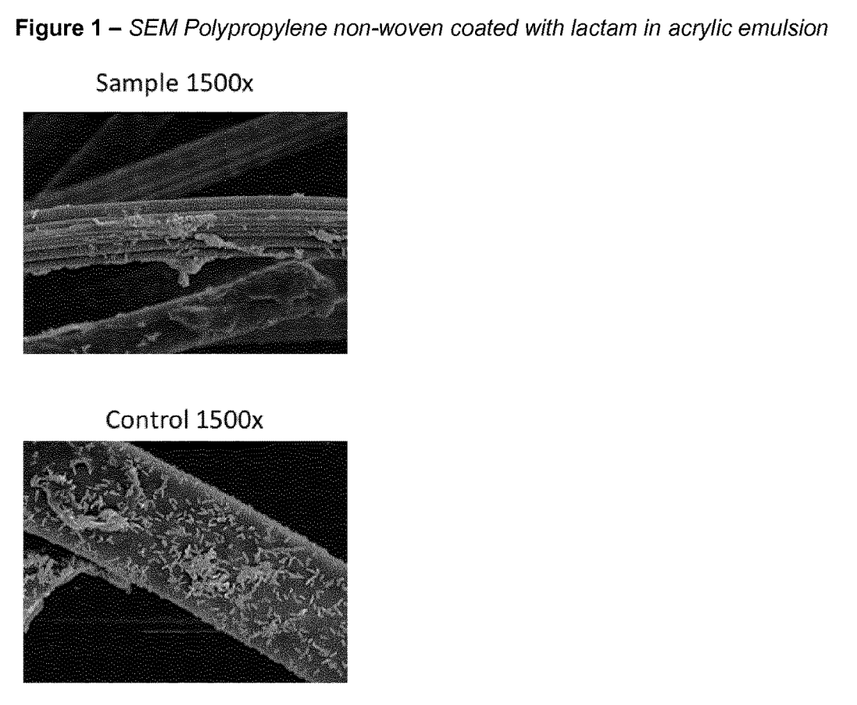
FIG. 1 is a pair of SEM images showing *Pseudomonas* biofilm inhibition on lactam-coated (acrylic amulsion) polypropylene textile compared to a control polypropylene textile

The polypropylene non-woven textile had much less bacteria coverage when treated with lactam. The control textile had 32.1% bacteria coverage, whereas the lactam treated textile had 10.1% bacteria coverage. The data is shown in FIG. 1.

Viscose Non-Woven Padded with Lactam in Polyurea Encaps

| Textile | Fibre (pixels) | Bacteria (pixels) | % bacteria coverage |
|---|---|---|---|
| Viscose non-woven | 17,759 | 16,291 | 47.8% |
| Viscose non-woven + lactam (488) | 18,961 | 1,806 | 8.7% |

Figure 2:
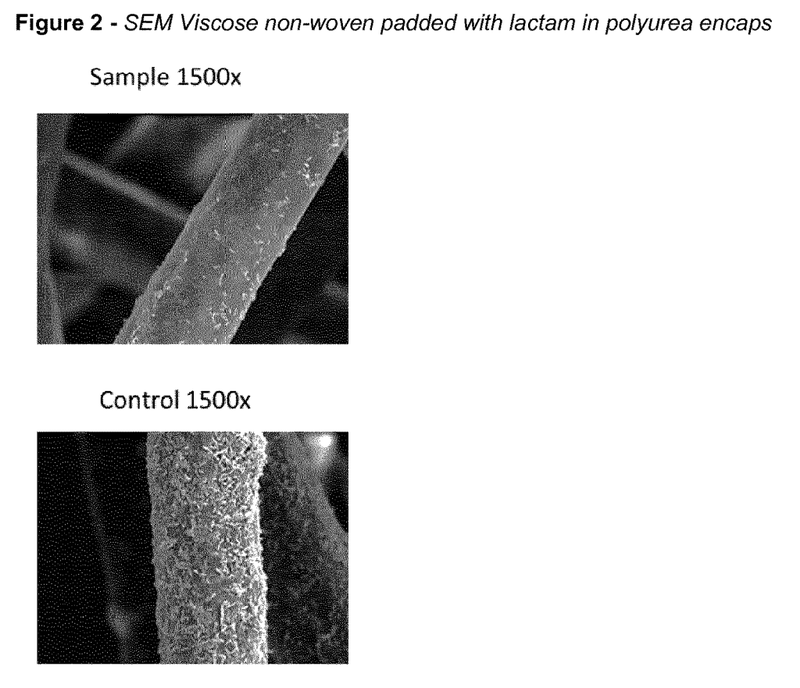
FIG. 2 is a pair of SEM images showing *Pseudomonas* biofilm inhibition on lactam-coated (padding with lactam encaps) viscose textile compared to a control viscose textile

The viscose non-woven textile had much less bacteria coverage when treated with lactam. The control textile had 47.8% bacteria coverage, whereas the lactam treated textile had 8.7% bacteria coverage. The data is shown in FIG. 2.

Polypropylene Non-Woven Printed with Lactam in Solvents

| Textile | Fibre (pixels) | Bacteria (pixels) | % bacteria coverage |
|---|---|---|---|
| Polypropylene non-woven | 15,914 | 26,917 | 62.6% |
| Polypropylene non-woven + lactam (488) (printed) | 25,335 | 23,381 | 48.0% |

Figure 3:
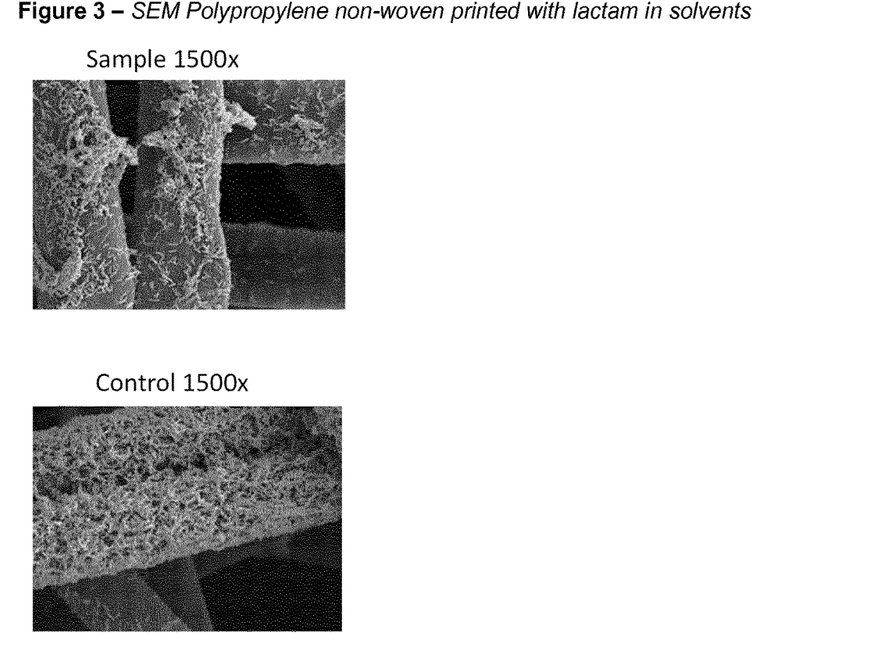
FIG. 3 is a pair of SEM images showing *Pseudomonas* biofilm inhibition on lactam-coated (printed onto textile) polypropylene textile compared to a control polypropylene textile

The polypropylene non-woven textile had less bacteria coverage when treated with lactam. The control textile had 62.6% bacteria coverage, whereas the lactam treated textile had 48.0% bacteria coverage. The data is shown in FIG. 3.

Fluorinated Polypropylene Non-Woven Coated with Cationic Lactam

| Textile | Fibre (pixels) | Bacteria (pixels) | % bacteria coverage |
|---|---|---|---|
| Fluorinated polypropylene non-woven | 8,696 | 30,880 | 78.0% |
| Fluorinated polypropylene non-woven + lactam (488) (cationic) | 27,493 | 15,864 | 36.6% |

Figure 4:
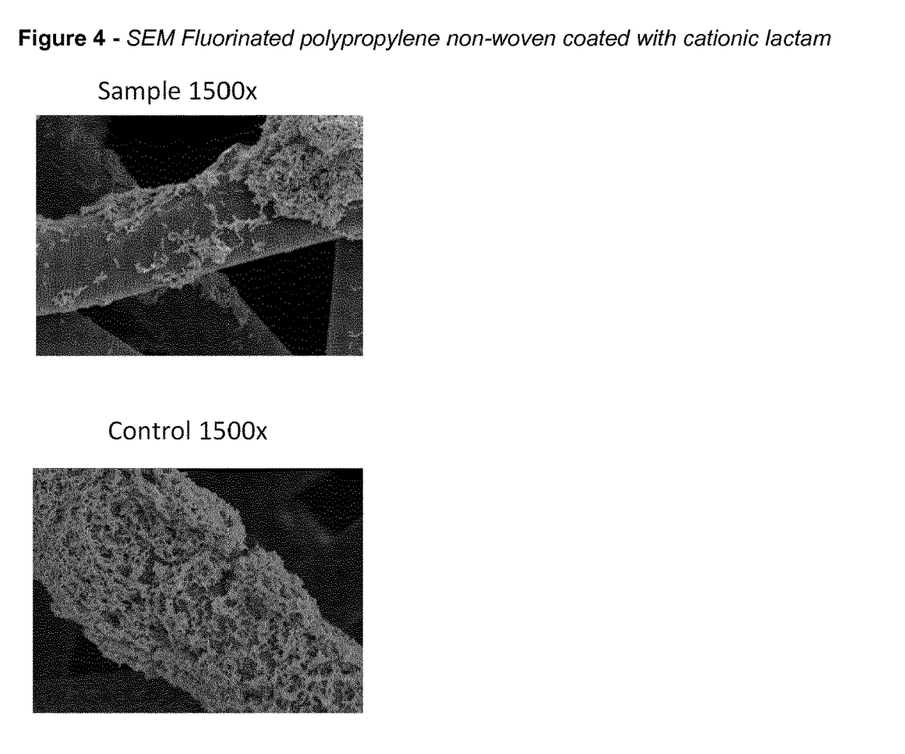
FIG. 4 is a pair of SEM images showing *Pseudomonas* biofilm inhibition on lactam-coated (direct electrostatic interaction with cationic lactam onto negatively charged textile) polypropylene textile compared to a control polypropylene textile

The fluorinated polypropylene non-woven textile had less bacteria coverage when treated with lactam. The control textile had 78.0% bacteria coverage, whereas the lactam treated textile had 36.6% bacteria coverage. The data is shown in FIG. 4.

It can be seen from the SEM images in the figures and from the data in the table that the modified lactam coated textile showed a great reduction in microorganisms. It is thus a bio-film ready textile as it is bio-film resistant and inhibits bio-film growth.

Example 2—*Pseudomonas Aeruginosa*-GFP Biofilm Growth Curve Inhibition on Lactam-Based Textiles by Fluorescence A fluorescent strain of *P. aeruginosa* was used to allow growth inhibition to be measured by fluorescence. *P. aeruginosa* GFP was cultured for 2 days at 30° C. on MEA plates. Prior to use in tests, colonies were added to 20 mL of brain-heart infusion broth (BHI) containing 5 mL of glass beads and homogenised for 30 seconds. The optical density was measured and adjusted to give 1×108 cfu/m. Subsequently, 0.5 mL of the strain in BHI broth was added to the wells of a 24 well plate containing the substrates. This was then placed in the plate reader and read every hour at emission 480 and excitation 520. The experiment tested a control (textile without lactam coating, the sample (textile coated with lactam) and a positive control (chlorhexidine).

Lactam in Acrylic Emulsion Binder on Textile

Figure 5:
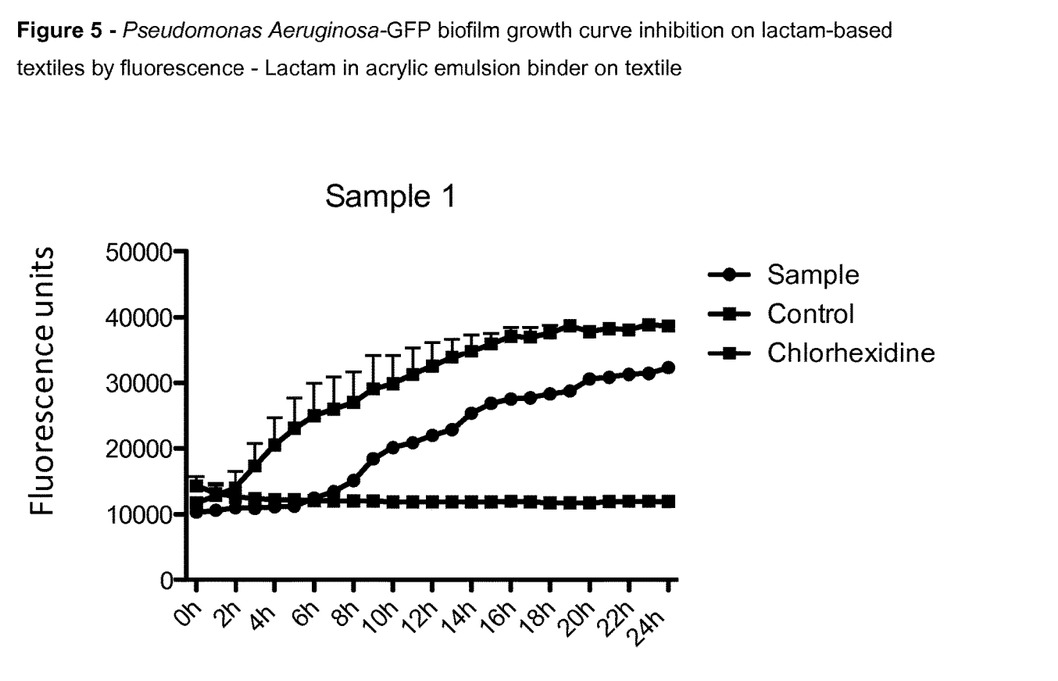
FIG. 5 is a graph showing *Pseudomonas Aeruginosa*-GFP biofilm growth curve inhibition on lactam-based textiles by fluorescence—Lactam in acrylic emulsion binder on textile

The following graph (showing FIG. 5) shows the effect of the lactam in acrylic emulsion binder on textile on *Pseudomonas Aeruginosa*-GFP biofilm growth curve inhibition by fluorescence.

Lactam Printed on Textile

Figure 6:
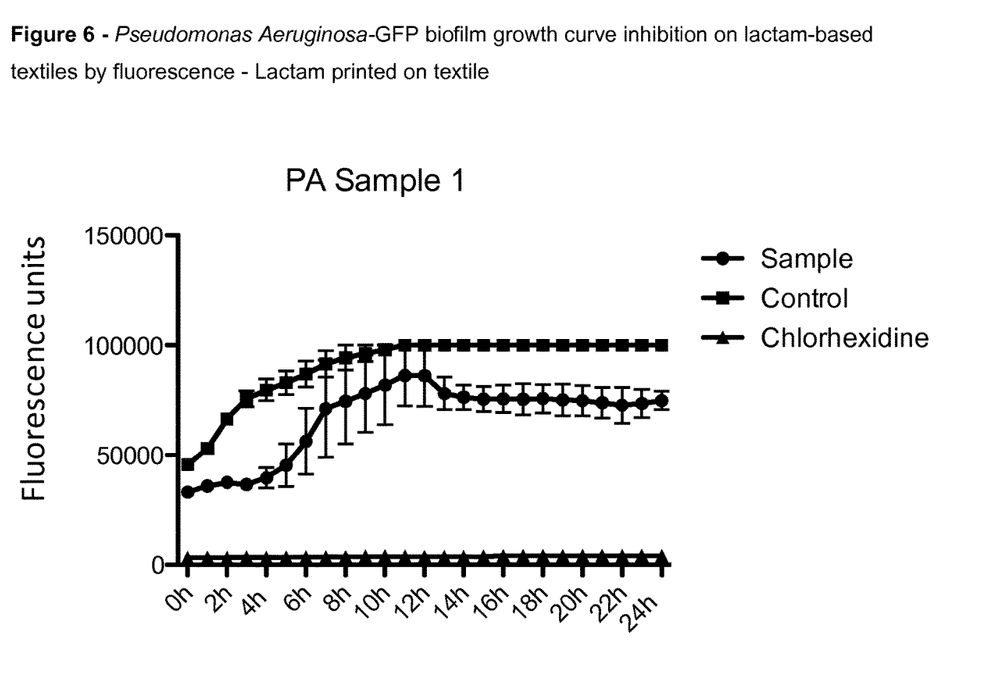
FIG. 6 is a graph showing *Pseudomonas Aeruginosa*-GFP biofilm growth curve inhibition on lactam-based textiles by fluorescence—Lactam printed on textile

The following graph (showing FIG. 6) shows the effect of the lactam printed on textile on *Pseudomonas Aeruginosa*-GFP biofilm growth curve inhibition by fluorescence.

Encapsulated Lactam Padded on Textile

Figure 7:
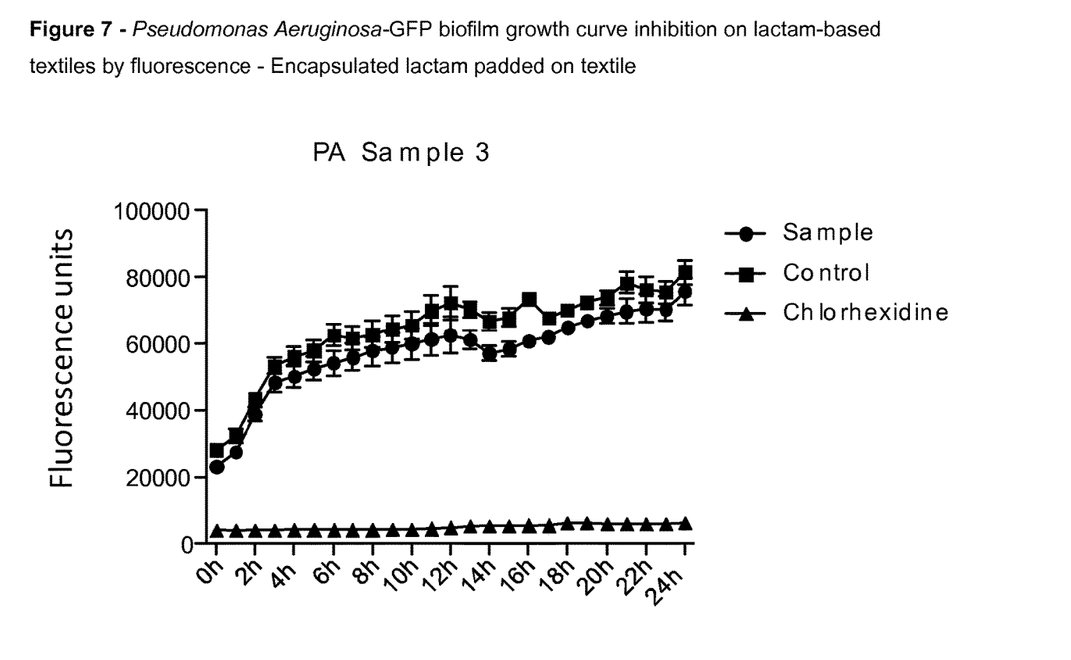
FIG. 7 is a graph showing *Pseudomonas Aeruginosa*-GFP biofilm growth curve inhibition on lactam-based textiles by fluorescence—Encapsulated lactam padded on textile

The following graph (showing FIG. 7) shows the effect of encapsulated lactam padded on textile on *Pseudomonas Aeruginosa*-GFP biofilm growth curve inhibition by fluorescence.

In all cases, the modified textile showed reduced *Pseudomonas Aeruginosa*-GFP biofilm growth on the textile compared to a textile without the lactam.

The example showed the efficacy of the modified textile coated with lactam via different methods, including coating via acrylic emulsion with binder; coating via printing on textile; and coating via encapsulated lactam padded onto textile.

Example 3—*Pseudomonas, Staphylococcus* and *Candida* Biofilm Growth Inhibition on Lactam-Based Acrylic Emulsion Cotton and PET Textiles by Viability

*P. aeruginosa* (PA01), *S. aureus* (Newman's strain) were cultured overnight at 37° C. on TSA 5 plates. *C. albicans* 3153A was cultured for 2 days at 30° C. on MEA plates. Prior to use in tests, colonies of each organism were added to 20 mL of brain-heart infusion broth (BHI) containing 5 mL of glass beads and homogenised for 30 seconds. The optical density of each organism was measured and adjusted to give 1×10$^7$ cfu/mL. Inoculum (0.3 ml) was placed directly on acrylic emulsion coated cotton and PET textiles (with and without lactam) that have been previously positioned inside the wells of 6-well plates and incubated overnight in appropriate broth. Textiles were subsequently removed, washed in PBS and metabolism assessed by AlamarBlue on a plate reader. Data were presented as percentage of no-lactam control. A number lower than 100 indicates a reduction in microorganism biofilm growth for the lactam coated textile compared to uncoated textile.

*Pseudomonas Aeruginosa* on Polyethylene and Cotton

| | Polyethylene | | Cotton | |
|---|---|---|---|---|
| | Mean | SD | Mean | SD |
| with lactam coating | 80.95 | 8.16 | 54.89 | 8.20 |

Figure 8:
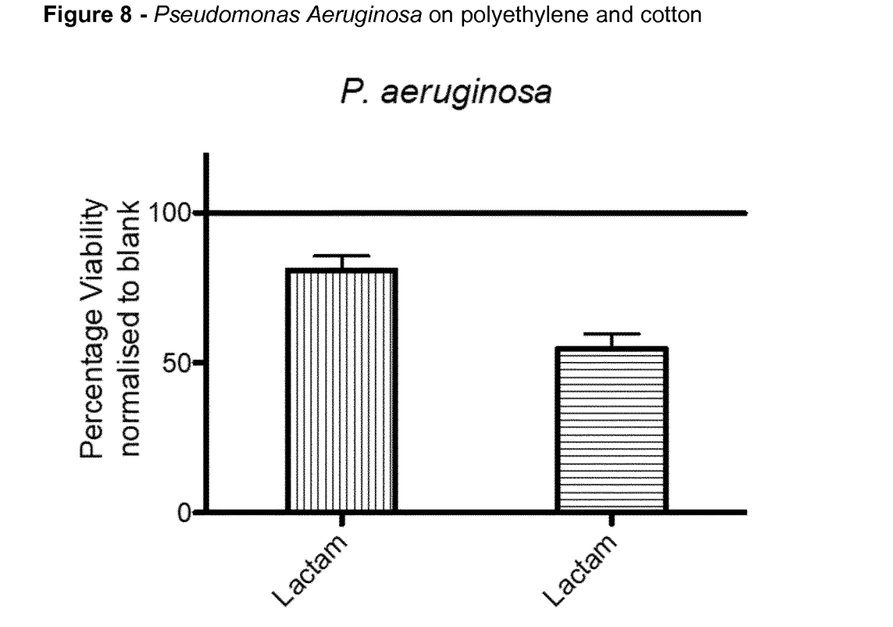
FIG. 8 is a graph showing *Pseudomonas Aeruginosa* biofilm growth inhibition on lactam-based textiles (polyethylene and cotton)

The graphical data is showed in FIG. 8.

The textile coated with lactam showed a reduction in *Pseudomonas Aeruginosa* biofilm growth compared to textile with no coating.

*Candida albicans* on Polyethylene and Cotton

|  | Polyethylene | | Cotton | |
| --- | --- | --- | --- | --- |
|  | Mean | SD | Mean | SD |
| with lactam coating | 67.83 | 2.75 | 84.69 | 15.32 |

Figure 9:
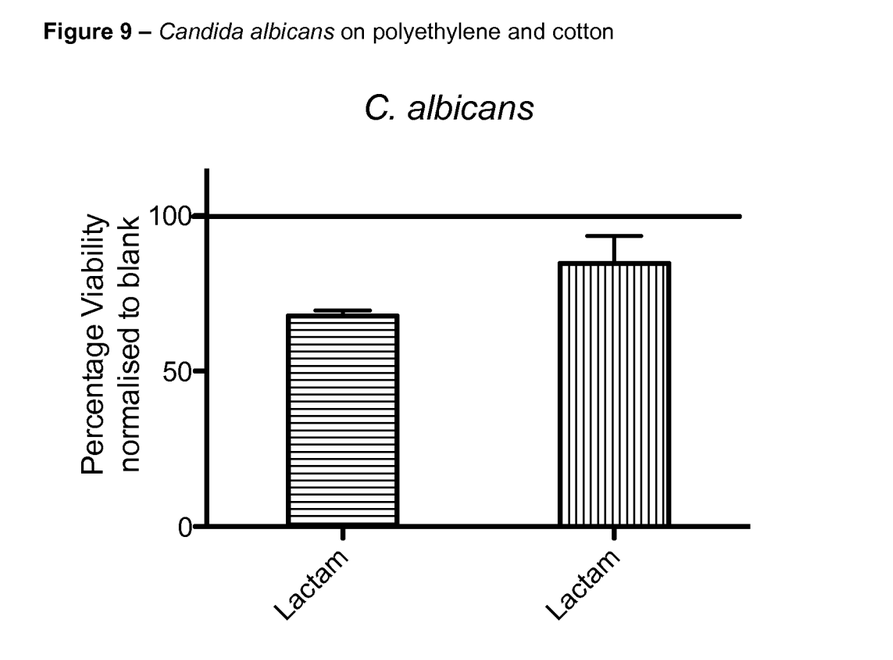
FIG. 9 is a graph showing *Candida albicans* biofilm growth inhibition on lactam-based textiles (polyethylene and cotton)

The graphical data is showed in FIG. 9.

The textile coated with lactam showed a reduction in *Pseudomonas Aeruginosa* biofilm growth compared to textile with no coating.

*Staphylococcus aureus* on Polyethylene and Cotton

|  | Polyethylene | | Cotton | |
| --- | --- | --- | --- | --- |
|  | Mean | SD | Mean | SD |
| with lactam coating | 47.88 | 1.46 | 33.35 | 3.69 |

Figure 10:
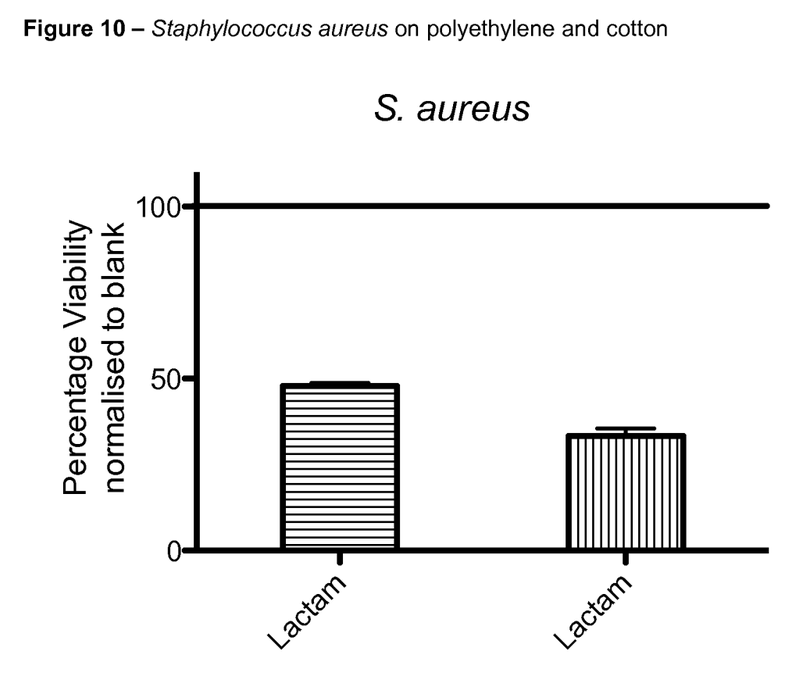
FIG. 10 is a graph showing *Staphylococcus aureus* biofilm growth inhibition on lactam-based textiles (polyethylene and cotton)

The graphical data is showed in FIG. 10.

The textile coated with lactam showed a reduction in *Pseudomonas Aeruginosa* biofilm growth compared to textile with no coating.

In all cases, for three difference microorganisms, the lactam coated textile showed a reduction in biofilm growth compared to textile with no coating.

The invention claimed is:

1. A modified textile comprising:
    a) a textile substrate; and,
    b) a lactam coating;
    wherein the lactam is 2. The modified textile according to claim 1, wherein the lactam is present at a level of from 0.001 to 1 wt. %.

3. A modified textile according to claim 1, wherein the lactam is in encapsulated form.

4. A modified textile according to claim 1, wherein the textile is selected from woven, knitted and non-woven textiles.

5. A modified textile according to claim 1, wherein the textile is selected from cotton, polyester, nylon elastane, viscose, polyethylene, polypropylene, rayon, wood pulp and mixtures of these prepared as composite.

6. A modified textile according to claim 1, additionally comprising an acrylic binder.

\* \* \* \* \*